March 17, 1970    E. CALVETE CAPDEVILA    3,500,500
APPARATUS FOR THE EXTRUSION OF SYNTHETIC PLASTIC MATERIAL
Filed Nov. 7, 1966
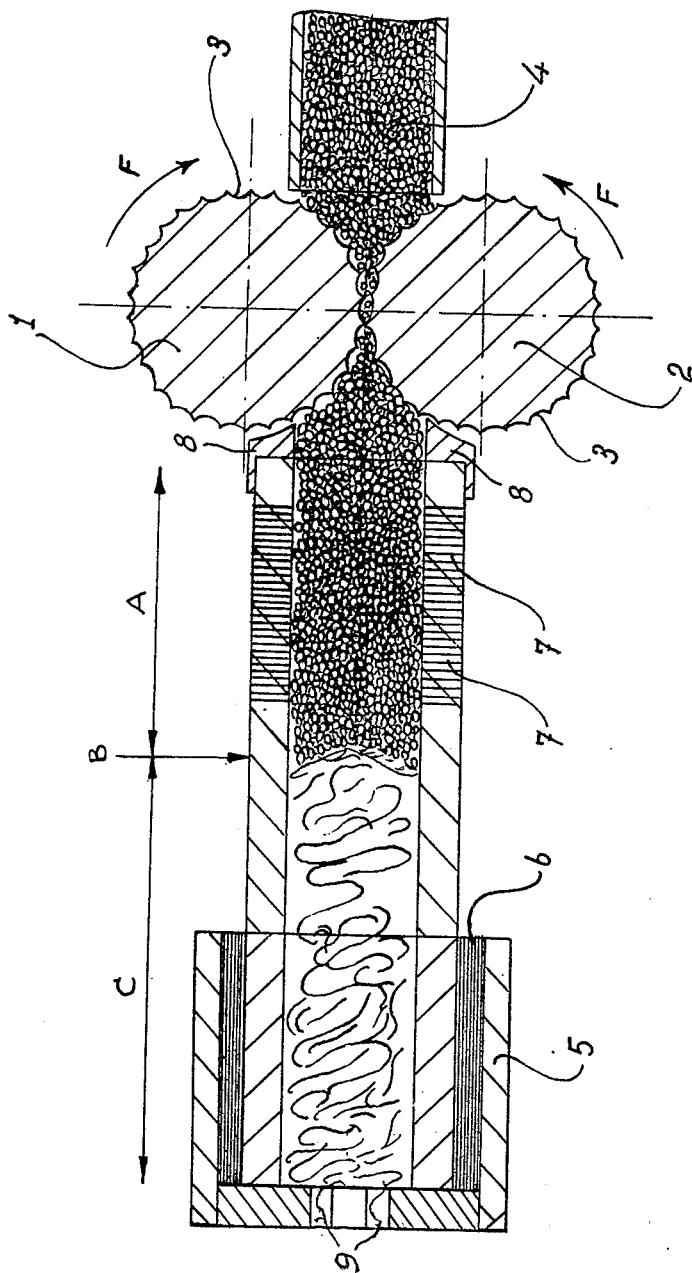

United States Patent Office 3,500,500
Patented Mar. 17, 1970

3,500,500
APPARATUS FOR THE EXTRUSION OF
SYNTHETIC PLASTIC MATERIAL
Eugenio Calvete Capdevila, Badalona, Barcelona, Spain,
assignor to Invenplast S.A., Barcelona, Spain
Filed Nov. 7, 1966, Ser. No. 592,471
Claims priority, application Spain, Nov. 13, 1965,
319,560
Int. Cl. B29f 3/012
U.S. Cl. 18—12                                    2 Claims

ABSTRACT OF THE DISCLOSURE

Improved apparatus for extruding synthetic thermoplastic material which includes a material inlet and outlet having an extruding head, a pair of oppositely rotatable, fluted feed rolls disposed in parallel between said inlet and outlet, and having the apices of the flutes of respective rolls in opposed near touching relation to positively compress and feed granular input material directed thereto. Knife means are provided on the discharge side of said rolls to separate the compressed plastic therefrom. A heating zone and heating means as well as gas bleed-off vent means are disposed between the discharge side of the feed rolls and the die head of the outlet.

---

This invention refers to an improved apparatus for the extrusion of synthetic plastic material.

An apparatus in this invention comprises feed roll elements that cause the movement of the raw material, grain or the like, said elements being fluted rolls having suitable driving force pressure and arranged almost tangentially in such a manner that each pair of confronting flutes or grooves act to forceable feed the mass towards the transformation chamber.

This chamber is situated coaxially with the axis of the material path and in front of the rolls and comprises a heating zone, between which zone and the rolls there are provided vents for the escape of gases.

The already fluid heated material is further compressed to a maximum, passes along the headstock until it is fully fused or softened, then arrives at and is extruded through the final die-plate. The outlets 9 of the die head are of smaller diameter than the entrance area of the material between rolls 1 and 2, the advantage thereof appearing hereinafter.

In order to better explain the invention, a sheet of drawings is attached to this specification showing one form of realization of same as an example only.

The single drawing represents a diametrical cross sectional view of the assembled apparatus, in which two rolls 1 and 2 may be seen in an almost tangential position, rotatable in the direction of the arrows F and provided on their peripheral surfaces with axial extended ribbings or striations 3 that function as positive feeding teeth on the granular material 4 forcing it to move towards the transformation chamber 5.

This chamber comprises a heating zone 6, between which and the two rolls are provided vents 7 for the escape of gases.

When the material grains are being compacted, the compressed grains are drawn along the surface of the roll flutes until removed by fixed cutters or scrapers 8. Scrapers 8 do not engage directly against the fluted surface of the rolls. The separated material moves forward in a compressed manner through zone A (see drawing) until it comes to the point B, where its fusion begins. The heated, melted material is compressed to the maximum in a fused state, as the outlets 9 of the nozzle (see drawing) are of smaller diameter than the entrance of the material between the rollers 1 and 2, and consequently the gases formed at the point B move back between the grains in the zone A and come out by the gas vents 7, leaving the fused material in zone C totally free from gases.

What I claim is:
1. Apparatus for extruding synthetic thermoplastic material comprising:
    (a) material inlet and outlet members including an extrusion head;
    (b) feed means for feeding said thermoplastic material entering in granular form comprising a pair of oppositely rotatable, fluted rolls disposed between the inlet and outlet members and in parallel to and almost touching one another, the flutes of said rolls confronting each other in respective pairs and having the apices of the flutes of the respective rolls in opposed very near touching relation to positively feed the material therethrough as the rolls are rotated; and
    (c) means defining a heating zone including a heat source in association therewith interposed between said feed means and said extrusion head to bring the granular into a fluid condition and aid in the conveying of it to the extrusion head, and the outlet member having a plurality of vents provided between said heating zone and said rolls for the escape of gases from said thermoplastic material.
2. Apparatus as defined in claim 1 wherein fixed, non-yieldable knife means are provided in the outlet member closely adjacent the discharge side of the rolls in close, but non-touching, relationship to separate the compressed granular material from the roll flutes.

References Cited

UNITED STATES PATENTS

| 1,752,471 | 4/1939  | Trebes.         |
| 2,205,328 | 6/1940  | Wills.          |
| 2,515,201 | 7/1950  | Dulmags et al.  |
| 3,158,899 | 12/1964 | Demeter.        |
| 3,177,127 | 6/1965  | Longstreth.     |
| 3,205,838 | 9/1965  | Frobeen et al.  |
| 3,280,886 | 10/1966 | Marshall et al. |
| 2,605,502 | 8/1952  | Culpepper et al.|

WILLIAM J. STEPHENSON, Primary Examiner

U.S. Cl. X.R.

18—8